(12) United States Patent
Fogel et al.

(10) Patent No.: US 11,208,577 B2
(45) Date of Patent: Dec. 28, 2021

(54) METHOD FOR PRODUCING A SINGLE-SIDED ADHESIVE FILM FOR SECURING A LOAD AND SINGLE-SIDED ADHESIVE FILM FOR SECURING A LOAD

(71) Applicants: Lohmann GmbH & Co. KG, Neuwied (DE); LOGIS AG, Heldenstein (DE); LOGIS TECHNOLOGIES GMBH, Heldenstein (DE)

(72) Inventors: Thomas Fogel, Oberraden (DE); Christoph Frieb, Eltmann (DE); Martin Haag, Munich (DE)

(73) Assignees: Lohmann GmbH & Co. KG, Neuwied (DE); LOGIS AG, Heldenstein (DE); LOGIS TECHNOLOGIES GMBH, Heldenstein (DE)

( * ) Notice: Subject to any disclaimer, the term of this patent is extended or adjusted under 35 U.S.C. 154(b) by 0 days.

(21) Appl. No.: 16/316,641

(22) PCT Filed: Jul. 11, 2017

(86) PCT No.: PCT/EP2017/067464
§ 371 (c)(1),
(2) Date: Jan. 10, 2019

(87) PCT Pub. No.: WO2018/011238
PCT Pub. Date: Jan. 18, 2018

(65) Prior Publication Data
US 2019/0153268 A1 May 23, 2019

(30) Foreign Application Priority Data
Jul. 11, 2016 (DE) .................. 10 2016 112 699.3

(51) Int. Cl.
*C09J 7/29* (2018.01)
*B32B 27/36* (2006.01)
(Continued)

(52) U.S. Cl.
CPC ............... *C09J 7/29* (2018.01); *B32B 27/36* (2013.01); *B60P 7/0884* (2013.01);
(Continued)

(58) Field of Classification Search
CPC .................................................. B05D 2350/00
See application file for complete search history.

(56) References Cited

U.S. PATENT DOCUMENTS 4,336,293 A * 6/1982 Eiden ............... B29C 59/046
156/209
4,755,337 A * 7/1988 Takahashi ............ C08J 7/0427
264/134

(Continued)

FOREIGN PATENT DOCUMENTS

DE            69506907 T2    7/1999
DE   20 2004 014 178 U1   12/2004
(Continued)

OTHER PUBLICATIONS

International Search Report dated Sep. 19, 2017, in International Application No. PCT/EP2017/067464 (7 pages).
(Continued)

*Primary Examiner* — Kelly M Gambetta
(74) *Attorney, Agent, or Firm* — Bookoff McAndrews, PLLC

(57) ABSTRACT

The present invention relates to a method for producing a single-sided adhesive film (1) for securing a load, comprising providing a backing layer (2) and coating a first side of the backing layer (2) with an adhesive layer (3), wherein a plastic (4) is applied to a second side of the backing layer (2) in order to form a non-slip surface on the adhesive film (1). Moreover, the present invention relates to a single-sided adhesive film (1) produced by the above method.

3 Claims, 1 Drawing Sheet

(51) Int. Cl.
*B60P 7/08* (2006.01)
*C09J 201/02* (2006.01)

(52) U.S. Cl.
CPC ......... *C09J 201/02* (2013.01); *B05D 2350/00* (2013.01); *B32B 2307/744* (2013.01); *B32B 2605/00* (2013.01); *C09J 2301/122* (2020.08); *C09J 2301/162* (2020.08); *C09J 2301/312* (2020.08); *C09J 2421/00* (2013.01); *C09J 2433/00* (2013.01); *C09J 2433/006* (2013.01); *C09J 2463/006* (2013.01); *C09J 2467/006* (2013.01); *C09J 2475/00* (2013.01); *C09J 2475/006* (2013.01); *C09J 2483/00* (2013.01)

(56) References Cited

U.S. PATENT DOCUMENTS

| | | | | |
|---|---|---|---|---|
| 5,491,015 A | * | 2/1996 | Reeves | B32B 7/05 |
| | | | | 428/167 |
| 6,431,629 B1 | | 8/2002 | Emery | |
| 2003/0012945 A1 | * | 1/2003 | Runge | C09J 7/255 |
| | | | | 428/317.1 |
| 2004/0229016 A1 | * | 11/2004 | Lipstein | B32B 38/06 |
| | | | | 428/143 |
| 2017/0203327 A1 | * | 7/2017 | Hawkins, Jr. | B05D 5/00 |

FOREIGN PATENT DOCUMENTS

| | | |
|---|---|---|
| DE | 10 2007 062 447 A1 | 6/2009 |
| DE | 20 2010 000 517 U1 | 8/2010 |
| DE | 10 2009 010 944 A1 | 9/2010 |
| DE | 10 2010 052 772 A1 | 6/2011 |
| EP | 0 788 565 B1 | 12/1998 |
| EP | 1 270 698 A2 | 1/2003 |
| EP | 2 789 501 A1 | 10/2014 |
| JP | 2010-43167 A | 2/2010 |
| JP | 2010043167 A * | 2/2010 |
| WO | 03/054099 A2 | 7/2003 |
| WO | 2010/054989 A2 | 5/2010 |
| WO | 2013/120287 A1 | 8/2013 |
| WO | 2014/019542 A1 | 2/2014 |

OTHER PUBLICATIONS

Office Action from German Patent Application No. 10 2016 112 699.3 dated Mar. 21, 2017 (5 pages).

* cited by examiner

METHOD FOR PRODUCING A SINGLE-SIDED ADHESIVE FILM FOR SECURING A LOAD AND SINGLE-SIDED ADHESIVE FILM FOR SECURING A LOAD

CROSS-REFERENCE TO RELATED APPLICATIONS

This application is the U.S. national phase entry under 35 U.S.C. § 371 of International Application No. PCT/EP2017/067464, filed on Jul. 11, 2017, which claims priority under 35 U.S.C. § 119 to German Patent Application No. 10 2016 112 699.3, filed Jul. 11, 2016.

TECHNICAL FIELD

The present invention relates to a method for producing a single-sided adhesive film for securing a load, comprising providing a backing layer and coating a first side of the backing layer with an adhesive layer. The present invention further relates to a single-sided adhesive film for securing a load that is produced by the above method.

PRIOR ART

The problem of load slippage in transport vehicles on sudden braking or in curves is sufficiently well-known. According to German road traffic regulations, for example, a load on the loading surface of a truck must not slip, because this could cause the vehicle to lose control, causing a considerable risk of an accident. However, loads must be secured against slippage in other means of transport as well, such as ships, aircraft or freight trains. Securing of loads is of increased importance in automobiles as well.

In order to deal with this problem, loading areas of transport vehicles are ordinarily equipped with non-slip substrates. Additional aids such as tensioning belts are often used. Moreover, non-slip mats that are in contact with the underside of cargo are also used. By means of the above-described measures, the coefficient of sliding friction $\mu D$ of cargo can be increased.

The coefficient of sliding friction $\mu D$ indicates the ratio of the frictional force acting against slippage of the load to the force with which the load is pressed against the loading surface or with which the load adheres to the loading surface. The more strongly the load adheres to the loading surface, the higher the coefficient of sliding friction. The coefficient of sliding friction is present between the surface of a loading area and the cargo stored on said surface.

Non-slip means are known that are not connected to the surface of the loading area of a transport vehicle in a long-lasting, structurally fixed manner. In this case, there is a further frictional contact between the loading surface of the transport vehicle and the non-slip means that shows a separate coefficient of sliding friction. Here, connected in a structurally fixed manner means that when one attempts to separate the actual loading surface from the non-slip surface applied thereto, this separation either does not occur or substantially does not occur at the interfaces of the two surfaces, instead occurring somewhere in the interconnected area.

In practice, non-slip substrates are frequently composed of rubber granules, which for example are bonded in polyurethane and are in the form of individual mats, with the coefficients of sliding friction of such substrates generally being between 0.6 and 0.8 $\mu D$. Alternatively, wooden boards provided with a non-slip coating are known that can be screwed onto the loading surface of a vehicle. The application of non-slip materials to the underside of the goods to be transported or to the underside of pallets that come into contact with the loading surface is also part of common practice. Such systems are described in DE 102009010944 A1, DE 202010000517 U1 and DE 202004014178 U1. The latter document discloses a non-skid device for cargo on a loading surface composed of a non-slip substrate for the cargo in the form of a kraft paper, cardboard or corrugated cardboard coated on at least one side, and preferably on both sides, with a non-slip polymer.

With respect to the compositions of non-slip surfaces, for example, WO 2014/019542 A1 discloses a non-slip coating composed of resin, polymethyl urea particles and photoinitiators, and WO 2010/054989 A2 discloses the processing of pyrogenic silica in nanoparticle form as an additive to non-slip coatings or floor coverings.

Moreover, DE 102010052772 A1 describes a non-slip floor for loading vehicles composed of a silkscreen floor, a leveling foundation applied thereto, a coating layer with sharp-edged granules interspersed therein and a final sealing layer.

Furthermore, U.S. Pat. No. 6,431,629 B1 describes a system for preventing load slippage composed of a plastic sheet material with two different layers, wherein a lower layer prevents slippage of the sheet material on the cargo bed and an upper layer prevents slippage of the load material on the sheet material.

Finally, EP 2789501 A1 discloses a commercial vehicle floor with a non-slip plastic film, wherein a plastic layer of the plastic film is undetachably bonded to the floor covering of the commercial vehicle.

Experience has shown that such a system shows weaknesses in anchoring of the adhesive to the non-slip film and/or the transport floor.

DESCRIPTION OF THE INVENTION

Based on the known prior art, an object of the present invention is to provide an improved method for producing a single-sided adhesive film for securing a load.

This object is achieved by means of a method with the features of claim 1. Advantageous embodiments are given in the dependent claims.

Accordingly, a method is provided for producing a single-sided adhesive film that comprises providing a backing layer and coating a first side of the backing layer with an adhesive layer. A plastic is applied to a second side of the backing layer in order to form a non-slip surface on the adhesive film. The backing layer is provided in the form of a polyester film. According to the invention, prior to bonding to the adhesive layer and the plastic, the polyester film is treated with trichloroacetic acid, sodium persulfate, iron chloride or copper chloride in order to increase the surface energy of the polyester film.

Single-sided adhesive film means that one side of the film has an adhesive in the form of an adhesive layer.

As the plastic is directly applied to a single-sided adhesive film, one obtains a film that can be used to prevent slippage, reduce noise, and protect against wear, opening up a wide variety of new possibilities for application. In particular, the adhesive film can easily be processed at the application site. The adhesive film need only be glued securely to the desired surface, for example to a loading surface in a motor vehicle or to the load itself, such as e.g. a pallet, crate, barrel and the like. In some cases, it is necessary to cut the adhesive film to conform to the geometry of the application area. Accordingly, no special technical means are required to install the adhesive film for securing a load in its area of application. This possibility of installing the adhesive film in an economical manner with respect to time and tools allows the film to be applied in the field. This means that it is not necessary to go to a specially-equipped workshop in order to apply the adhesive film to its application area, such as e.g. a loading surface of a motor vehicle.

The adhesive film for securing a load combines the flexibility of non-slip mats with a mode of application that is precisely tailored to the dimensions of the loading surface, structural anchoring on said surface, and the reliability of directly coating the application surface with a non-slip material.

The backing layer of the adhesive film serves as a base element and favors both the adhesion of the adhesive to the one side and that of the plastic to the other side.

By means of the above-described method, one obtains an adhesive film that is ready to process and self-adhesive and can be secured on an application area, such as e.g. a loading surface of a motor vehicle, simply by manually pressing it onto said area. The adhesive is selected such that it can be secured on wood floors, silkscreen plates, aluminum floors, steel floors, and even side walls, for example for impact protection.

The structure of the adhesive film and its long-term, secure positioning on the application area make the adhesive film more wear-resistant than non-slip mats. Moreover, the need for actions such as moving, positioning and stowing, which are required for non-slip mats, is obviated, which is reflected in considerable time savings. In the transport field, this allows downtimes to be substantially reduced.

The stationary bonding of the adhesive film also positively affects the safety of the worker, for example a worker at the loading area. The adhesive film cannot slip, so it cannot lie around unsecured on the loading surface and constitute a tripping hazard for the user.

The polyester film can be configured to be extremely thin, for example with a thickness of 12 to 75 µm, more particularly 23 to 50 µm, and thus to not substantially contribute to the thickness of the adhesive film. At the same time, the polyester film forms a suitable basis for providing structural cohesion of the components of the adhesive film.

Alternatively, the backing layer can also comprise materials such as polyethylene naphthalate, polyvinyl chloride, polycarbonate, papers, polypropylene webs, PET webs, cellulose- or plastic-based fabrics, laid webs, or films based on di- and triacetate or combinations of the above materials.

The surface of the polyester film is modified by the treatment with trichloroacetic acid, thus modifying the surface properties of the polyester. In this manner, the molecular structure of the surface of the polyester film is modified, thus increasing the surface energy of the polyester film and in turn improving the property of the polyester film of forming long-term bonds. Adhesives, waxes or resins and the like can thus better be permanently anchored to the polyester film.

The trichloroacetic acid treatment can be followed by further surface treatments, such as e.g. matt lacquer treatment or thermostabilizing, in order to prepare the polyester film for specific applications.

As an alternative to trichloroacetic acid treatment, the polyester film can also be treated with sodium persulfate, iron chloride, copper chloride and the like.

In a further preferred embodiment, the plastic is sprayed onto the second side of the backing layer. In order to produce the non-slip adhesive film, the plastic is directly sprayed onto the second side of the backing layer using a spraying machine, thus allowing a plastic spray layer measuring 1 mm to several cm in thickness to be applied in a single operation. Spray treatment of the plastic also makes it possible to apply the plastic to the backing layer in a vertical arrangement, for example an arrangement on the side walls of the loading surface or an upside down arrangement.

In a further embodiment, the plastic hardens on the backing layer and is thus fixed to it. After the plastic has been applied to the backing layer, it reacts within a few seconds, i.e. at most 10 seconds. After only a few minutes, the entire hardening process is already completed to such an extent that the adhesive film for securing a load can be further processed and can already be walked on.

The plastic hardens with virtually no shrinkage and can therefore be applied, depending on requirements, in layer thicknesses of several mm. Moreover, the plastic is preferably machine-processed.

Because of the rapid hardening, the adhesive film coating can also be applied in a vertical arrangement. This provides additional freedom in designing the production process.

In a further preferred embodiment, a release film is applied to the side of the adhesive facing away from the backing layer. The application of a release film, also referred to as a release liner, contributes to improving handling of the adhesive film. After the release film is peeled off the adhesive film, the adhesive film need only be applied to the application area and is immediately ready for use. The release film facilitates storage and transport of the adhesive film for securing a load. For example, the adhesive film can be rolled into a roll and stored and transported accordingly. All relevant known materials can be used as release liner materials, such as papers or plastic films or combinations thereof, optionally coated with a release agent such as e.g. silicone.

The above-mentioned object is also achieved by means of a single-sided adhesive film for securing a load having the features of claim 5. Advantageous embodiments are given in the dependent claims.

Accordingly, a single-sided adhesive film for securing a load is provided that is producible by a method according to the above-described embodiments and comprises a backing layer and an adhesive layer, wherein the adhesive layer is arranged on a first side of the backing layer. On a second side of the backing layer, a plastic in the form of a coating for providing a non-slip surface is arranged on the adhesive film. According to the invention, the backing layer is a polyester film, in particular a polyester film treated with trichloroacetic acid, sodium persulfate, iron chloride or copper chloride.

In addition to a coating with a non-slip property, other coatings having other properties can also be applied, e.g. for example materials with noise-reducing properties or materials with highly wear-resistant surfaces.

A single-sided adhesive film with this type of structure can be rapidly and easily laid and can be provided in a largely flexible length and width for preventing slippage, reducing noise, or if necessary producing highly wear-resistant surfaces. In the field of transport, the single-sided non-slip adhesive film allows efficient loading, wherein costs can be saved compared to conventional solutions. When a loading surface is covered with the single-sided adhesive film, the use of non-slip mats is no longer necessary. Moreover, fewer lashing straps are required, as the load need only be secured against shifting and tipping.

As the need for non-slip mats is obviated, downtimes are also reduced, because it is no longer necessary to move and stow the non-slip mats. The overall safety of the user in loading and securing cargo can be increased by means of the single-sided adhesive film.

The single-sided adhesive film can be cut to size on site, wherein a specific cutting geometry tailored to the application can be selected. For example, it is also possible to arrange the single-sided adhesive film only on selected sites of an application area, such as e.g. a transport area, at which there is an increased need or simply a need for preventing slippage, reducing noise and/or protecting against wear. This means that the single-sided adhesive film need not necessarily be arranged over the entire surface of the application area.

The polyester film forms a suitable basis for providing sufficient cohesion of the components of the adhesive film. Moreover, a polyester film with a surface etched using trichloroacetic acid provides modified surface characteristics. The molecular structure at the surface of the polyester film is modified, thus increasing the surface energy of the polyester film and in turn improving the property of the polyester film of forming long-term bonds. Adhesives, waxes or resins and the like can thus better be permanently anchored to the polyester film.

A polyester film provides an optimum basis for coating with a functional chemical compound such as e.g. an adhesive. In a further preferred embodiment, the backing layer has a thickness of 12 to 75 μm, and preferably 23 to 50 μm. These extremely thin layer thicknesses of the polyester film contribute to reducing the overall thickness of the single-sided adhesive film. At the same time, the backing layer is capable of providing sufficiently strong adhesion with respect to both the adhesive layer and the plastic coating.

In an improvement, the adhesive layer is a solution based on dispersions or solvent-based or solvent-free pressure-sensitive adhesive, heat- or moisture-activatable systems or hotmelts based on acrylates, rubber, polyurethane, and/or silicone adhesives or blends thereof. The selection of the adhesive material depends on the substrate material to be bonded, and accordingly can vary widely. The adhesive layer can be applied to the entire surface, or for example for cost reasons be applied to a portion of the surface in point-shaped, diamond-shaped or similar geometries.

The adhesive layer is arranged on the backing layer with a weight per unit area of preferably 5 to 300 g/m$^2$, particularly preferably 50 to 250 g/m$^2$, and most particularly preferably 80 to 200 g/m$^2$.

In a further preferred improvement, the plastic comprises polyurethane. Polyurethane can be directly applied in liquid form to the backing layer of the adhesive film. The polyurethane can then harden on the backing layer and become fixed thereto. An example of a polyurethane suitable as a plastic coating is diethylmethylbenzenediamine. A further suitable polyurethane is for example the combination of diphenyl metadiisocyanate prepolymer, 4,4'-methylene diphenyl diisocyanate and diphenylmethane-2,4'-diisocyanate. Alternatively, a polyurethane film configured according to the application requirements can be structurally bonded to the side of the adhesive film facing away from the adhesive side, for example by means of bonding or sealing.

In a further preferred embodiment, the plastic comprises an epoxy resin or a polyester resin. Epoxy resins and polyester resins can either be applied in liquid form to the side facing away from the adhesive side of the adhesive film or can be provided in the form of a filmlike layer. This layer can be bonded to the backing layer, e.g. unrolled onto it. Epoxy resins and polyester resins belong to the group of the duromers, which are characterized by macromolecules with close spatial crosslinking. Duromers show low formability. It is therefore possible to provide a wear-resistant coating, for example by means of epoxy resin or polyester resin coating of the single-sided adhesive film. Compared to other plastic coatings, a single-sided adhesive film comprising an epoxy resin or polyester resin coating shows significantly higher wear resistance. Like the adhesive coating, the surface on the side opposite the adhesive layer can also be provided over its entire surface with the material provided for the intended application, or for cost reasons or because of a certain degree of conductivity, it can also be provided over a portion of the surface in various geometries, such as e.g. point-shaped or line-shaped geometries.

Accordingly, a single-sided adhesive film of this type is suitable for fields of application such as transportation of piece goods, plant construction conveyor systems, switching technology, slides, hoppers, placement chutes, tipping troughs and pipes in which a high degree of protection from wear is required. The common practice to date in these fields of application has been to take the goods to be coated to a production site, where they are coated with a wear-resistant surface. This constitutes a considerable time and cost factor. By means of the above-described single-sided adhesive film, which for example has a wear-resistant coating, it is possible to coat the goods in question on site, i.e. directly at the site of application. This allows time and cost requirements to be reduced.

Moreover, a wear-resistant coating can be used in a much more flexible and targeted manner. For example, the single-sided adhesive film can be used in a tipping trough only at sites for which increased wear is generally to be expected.

Alternatively, materials such as polyethylene, Hostalen or polytetrafluoroethylene can also be used as a wear-resistant coating of the single-sided adhesive film.

In a further preferred embodiment, the side of the plastic facing away from the backing layer has a hard particle surface. This allows the single-sided adhesive film to ensure a high degree of slip resistance on wet surfaces as well. This is particularly advantageous for loading surfaces that are directly exposed to weathering. In this manner, for example, a loading surface of a truck that has become wet due to rain can provide the user with sufficient slip resistance.

In a further preferred embodiment, a release film is arranged on the side of the adhesive facing away from the backing layer. The release film, also referred to as a release liner, on the one hand allows simple storage, as the single-sided adhesive film can be wound up into rolls. On the other hand, the single-sided adhesive film is processable due to the release film. After the release film is peeled off, the single-sided adhesive film can be directly applied to the application site.

In a further preferred improvement, the plastic has a coefficient of friction of $\mu D > 0.6$. These coefficients of friction are certified according to VDI Guideline 2700/pg. 14. The indicated coefficients of sliding friction are the basis for dimensioning of load securing according to DIN-EN 12195-1 (June, 2011). Accordingly, the single-sided adhesive allows higher than average load securing properties in both a dry and a wet state.

The above-described single-sided adhesive film can also be used in the food industry. Various materials are used in the food industry, for example for linings of transport materials that meet special requirements. The single-sided adhesive film can thus be used as a food-resistant self-adhesive coating for transport materials and optionally also meet other requirements, such as e.g. requirements for kosher or halal surfaces.

In addition, the backing layer and/or the plastic can also be configured to have electrically and/or thermally conductive, anti-static, flame-retardant, and/or heat-insulating properties.

BRIEF DESCRIPTION OF THE FIGURES

Preferred further embodiments and aspects of the present invention are explained in further detail in the following description of the figures. The figures show the following.

DETAILED DESCRIPTION OF THE PREFERRED EMBODIMENTS

In the following, preferred examples are described with reference to the figures. Elements that are identical, similar or have the same effect are indicated by the same reference numbers. In order to avoid redundancy, repeated description of these elements is sometimes dispensed with in the following description.

Figure 1:
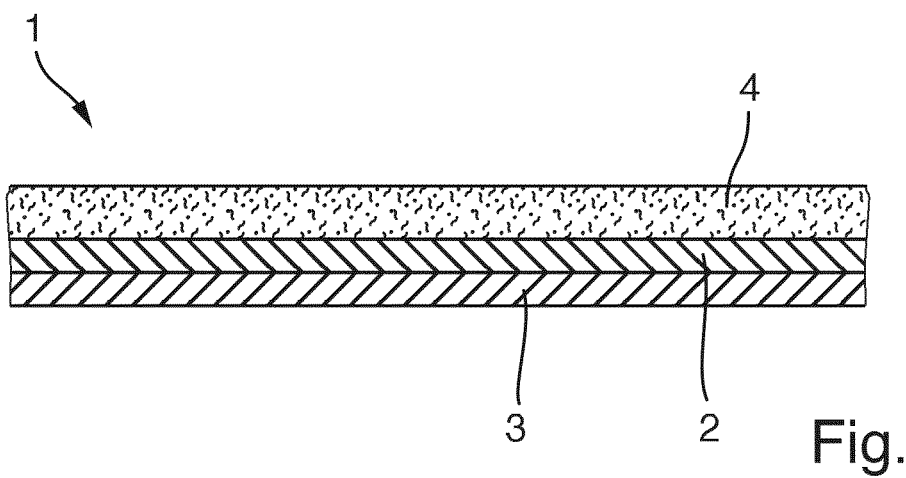
FIG. 1 is a schematic side view of the layer structure of a single-sided adhesive film comprising a layer of a friction-increasing material.
Figure 2:
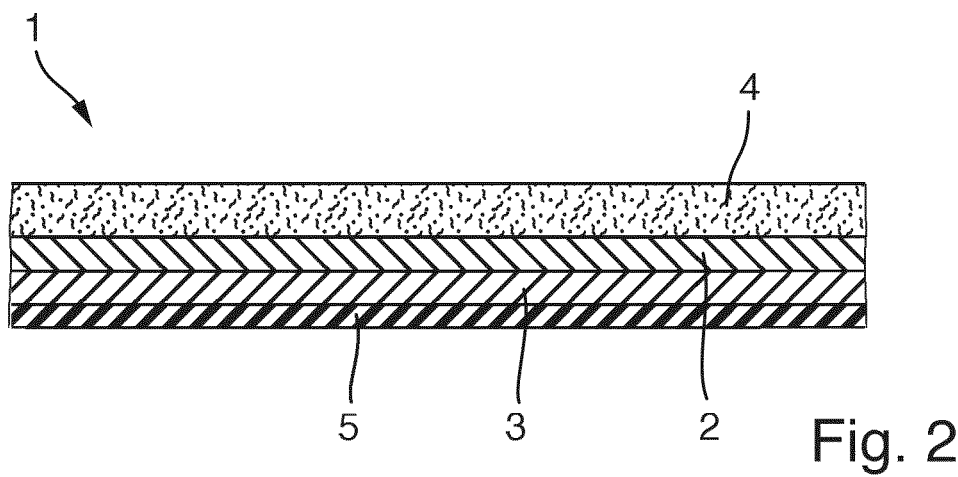
FIG. 2 is a schematic side view of the single-sided adhesive film of FIG. 1 with a release film.

FIGS. 1 and 2 show a single-sided adhesive film for securing a load that comprises a backing layer 2, an adhesive layer 3 and a plastic 4 in the form of a plastic spray coating.

The backing layer 2 forms an optimum basis for coating with a functional chemical compound. The backing layer 2 is a polyester film that has been treated with trichloroacetic acid in order to increase its surface energy and improve its adhesion properties. Here, the backing layer 2 is the polyester film Coveme Kemafoil HPH23. The etching treatment of the backing layer 2 with trichloroacetic acid makes it possible to provide ideal adhesion properties of the backing layer 2 with respect to the adhesive layer 3 and the plastic 4.

As an alternative to trichloroacetic acid treatment, the polyester film can also be treated with sodium persulfate, iron chloride, copper chloride and the like.

Alternatively, the backing layer can also comprise materials such as polyethylene naphthalate, polyvinyl chloride, polycarbonate, papers, polypropylene webs, PET webs, cellulose- or plastic-based fabrics, laid webs, or films based on di- and triacetate or combinations of the above materials.

The adhesive 3 is a dispersion acrylate such as e.g. LK-8203 from Lohmann GmbH & Co. KG. Alternatively, other adhesive systems based on dispersions or solvent-based or solvent-free pressure-sensitive adhesive, heat- or moisture-activatable systems or hotmelts based on acrylates, rubber, polyurethane, and/or silicone adhesives or blends thereof can also be used.

For example, the adhesive layer 3 is suitable for securing the single-sided adhesive film 1 to loading surfaces of motor vehicles such as flatbed trucks, load-carrying vehicles and the like. Such loading surfaces generally comprise materials such as e.g. steel, aluminum, wood and/or plastic.

Moreover, the adhesive layer 3 is capable of forming a long-term bond with the etched surface of the backing layer 2.

The adhesive layer is arranged on the backing layer with a weight per unit area of preferably 5 to 300 g/m$^2$, particularly preferably 50 to 250 g/m$^2$, and most particularly preferably 80 to 200 g/m$^2$.

For prevention of slippage, polyurethane is ordinarily used as the plastic 4. Here, an example of a polyurethane suitable as a plastic coating is diethylmethylbenzenediamine. Alternatively, other polyurethanes, such as e.g. diphenylmethane-diisocyanate-based prepolymer, 4,4'-methylene diphenyl diisocyanate and diphenylmethane-2,4'-diisocyanate can also be used.

In order to produce the single-sided adhesive film, the plastic 4 is applied to the backing layer 2, for example by means of a spraying machine. The plastic spray coating then hardens on the backing layer 2, wherein it undergoes long-term adhesive bonding with the surface of the backing layer 2. Alternatively, the plastic can also be poured onto the backing layer in the form of a cast plastic layer.

The layer based on the plastic 4 is permanently elastic and possesses, for example, non-slip and/or noise reducing and/or wear resistant properties. In the case of slippage prevention, the coefficient of friction μD of the surface of the plastic spray coating can be up to 0.9 and above. In a wet state, caused for example by rainwater, the coefficient of friction μD of the plastic spray coating is still at least 0.6.

FIG. 2 shows a single-sided adhesive film 1 that is the same as in FIG. 1, except that a release film 5 is arranged on the side of the adhesive layer facing away from the backing layer 2. By means of the release film 5, the single-sided adhesive film 1 can be rolled up and then stored or transported. In order to firmly attach the single-sided adhesive film 1 to an application surface such as e.g. a loading surface of a truck, it is only necessary to peel off the release film 5 and press the single-sided adhesive film onto the application surface.

For example, the release film 5 is a polypropylene film from the firm Infiana having a thickness of 100 μm. Alternatively, other commonly-used release liners can be used as the release film.

If applicable, all of the individual features presented in the individual examples may be combined and/or exchanged with one another without departing from the scope of the invention.

LIST OF REFERENCE NOS

1 Adhesive film
2 Backing layer
3 Adhesive layer
4 Plastic
5 Release film

The invention claimed is:

1. A method for producing a single-sided adhesive film for securing a load, comprising:
   providing a backing layer; and
   coating a first side of the backing layer with an adhesive layer,
   wherein a plastic is applied to a second side of the backing layer in order to form a non-slip surface on the adhesive film, and
   wherein the backing layer is provided in the form of a polyester film,
   characterized in that prior to bonding to the adhesive layer and the plastic, the polyester film is treated with trichloroacetic acid, sodium persulfate, iron chloride or copper chloride in order to increase the surface energy of the polyester film,
   wherein the plastic comprises polyurethane and is directly sprayed onto the second side of the backing layer so that the non-slip surface is planar.

2. The method as claimed in claim 1, characterized in that the plastic hardens on the backing layer and is thus fixed to the backing layer.

3. The method as claimed in claim 1, characterized in that a release film is applied to the side of the adhesive layer facing away from the backing layer.

* * * * *